(12) United States Patent
East

(10) Patent No.: US 12,218,456 B2
(45) Date of Patent: Feb. 4, 2025

(54) MODULAR ELECTRICAL WIRING ASSEMBLY

(71) Applicant: Paul East, Athens, TN (US)

(72) Inventor: Paul East, Athens, TN (US)

( * ) Notice: Subject to any disclaimer, the term of this patent is extended or adjusted under 35 U.S.C. 154(b) by 893 days.

(21) Appl. No.: 17/242,633

(22) Filed: Apr. 28, 2021

(65) Prior Publication Data

US 2022/0352670 A1 Nov. 3, 2022

(51) Int. Cl.
*H01R 13/514* (2006.01)
*H01R 13/518* (2006.01)
*H01R 13/74* (2006.01)

(52) U.S. Cl.
CPC ......... *H01R 13/514* (2013.01); *H01R 13/518* (2013.01); *H01R 13/748* (2013.01)

(58) Field of Classification Search
CPC .. H01R 13/514; H01R 13/516; H01R 13/518; H01R 13/74; H01R 13/748
USPC ........................................................ 439/701
See application file for complete search history.

(56) References Cited

U.S. PATENT DOCUMENTS

| 4,165,443 | A | 8/1979 | Figart |
| D318,848 | S | 8/1991 | Scholl |
| 6,201,187 | B1 | 3/2001 | Burbine |
| 6,361,333 | B1 | 3/2002 | Cash, Jr. |
| 6,617,511 | B2 | 9/2003 | Schultz |
| 6,945,815 | B1 | 9/2005 | Mullally |
| 2022/0352670 | A1* | 11/2022 | East ................. H02G 3/125 |

FOREIGN PATENT DOCUMENTS

WO WO0126184 4/2001

* cited by examiner

*Primary Examiner* — Khiem M Nguyen

(57) ABSTRACT

A modular electrical wiring assembly allowing for quick installation and replacement of outlets, switches, and the like includes a bracket, a receptacle, and an interface element. The bracket is mountable to a structural element so that the bracket is recessed from an outer surface of the structural element. The receptacle is selectively mountable to the bracket and is operationally engageable to an electrical circuit. An interface element is selectively mountable to the receptacle so that the interface element is operationally engaged to the electrical circuit. The interface element, such as an outlet, a switch, and the like, can be readily installed and replaced.

Figure 1:
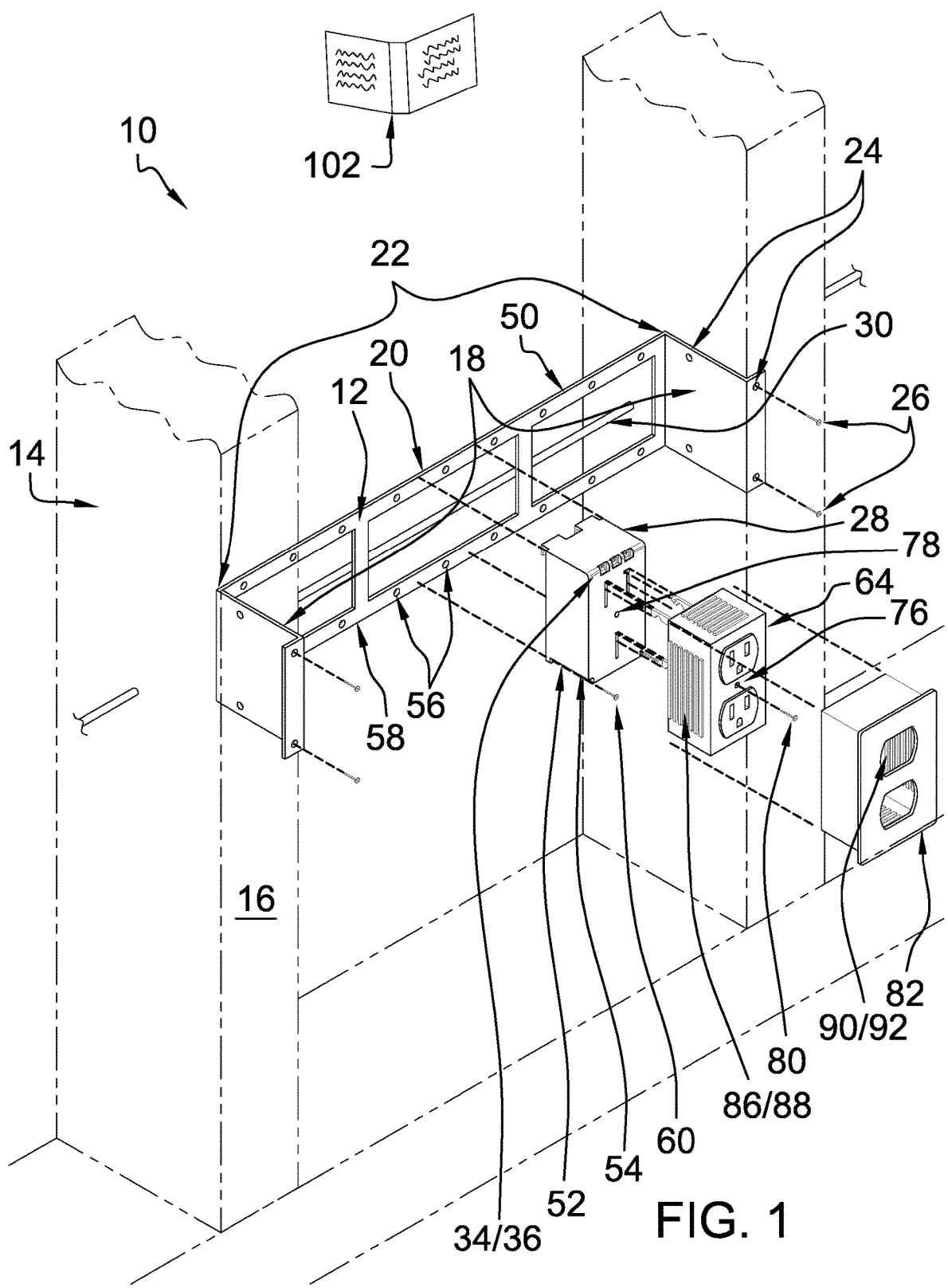

18 Claims, 9 Drawing Sheets

MODULAR ELECTRICAL WIRING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wiring assemblies and more particularly pertains to a new wiring assembly allowing for quick installation and replacement of outlets, switches, and the like. The present invention discloses a wiring assembly comprising a receptacle, which is mountable to a bracket mounted to a structural element and connectable to an electrical circuit. A variety of interface elements comprising one or more of outlets, sockets, switches, bulbs, ports, and the like, are selectively engageable to the receptacle to connect them to the electrical circuit. A cover plate is attachable to the interface element without use of screws.

(2) Description of Related Art Including Information Disclosed Under 37 CFR 1.97 and 1.98

The prior art relates to wiring assemblies, and in particular wiring assemblies that facilitate installation and changing of components. Prior art wiring assemblies may comprise box shaped receptacles configured to electrically engage insertable interface elements. Such prior art wiring assemblies are dependent on proper positioning of the receptacle and may leave electrical connections exposed. What is lacking in the prior art is a wiring assembly comprising a bracket for properly positioning the receptacle, wherein apertures in the receptacle are positioned for insertion of connectors engaged to an interface element to engage the interface element to an electrical circuit. The interface element also serves to cover electrical connections between the receptacle and the electrical circuit. These prior art wiring assemblies also lack a cover plate which is attachable to the interface element without use of screws.

BRIEF SUMMARY OF THE INVENTION

An embodiment of the disclosure meets the needs presented above by generally comprising a bracket, a receptacle, and an interface element. The bracket is configured to be mounted to a structural element so that the bracket is recessed from an outer surface of the structural element. The receptacle is selectively mountable to the bracket and is configured to operationally engage an electrical circuit. An interface element is selectively mountable to the receptacle so that the interface element is operationally engaged to the electrical circuit. The interface element, such as an outlet, a switch, and the like, can be readily installed and replaced. Some embodiments include a cover plate, which is selectively engageable to the interface element so that the interface element is accessible. The cover plate is configured to cover gaps between the interface element and the structural element, or gaps between the interface element and a wall panel engaged to the structural element.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

Figure 2:
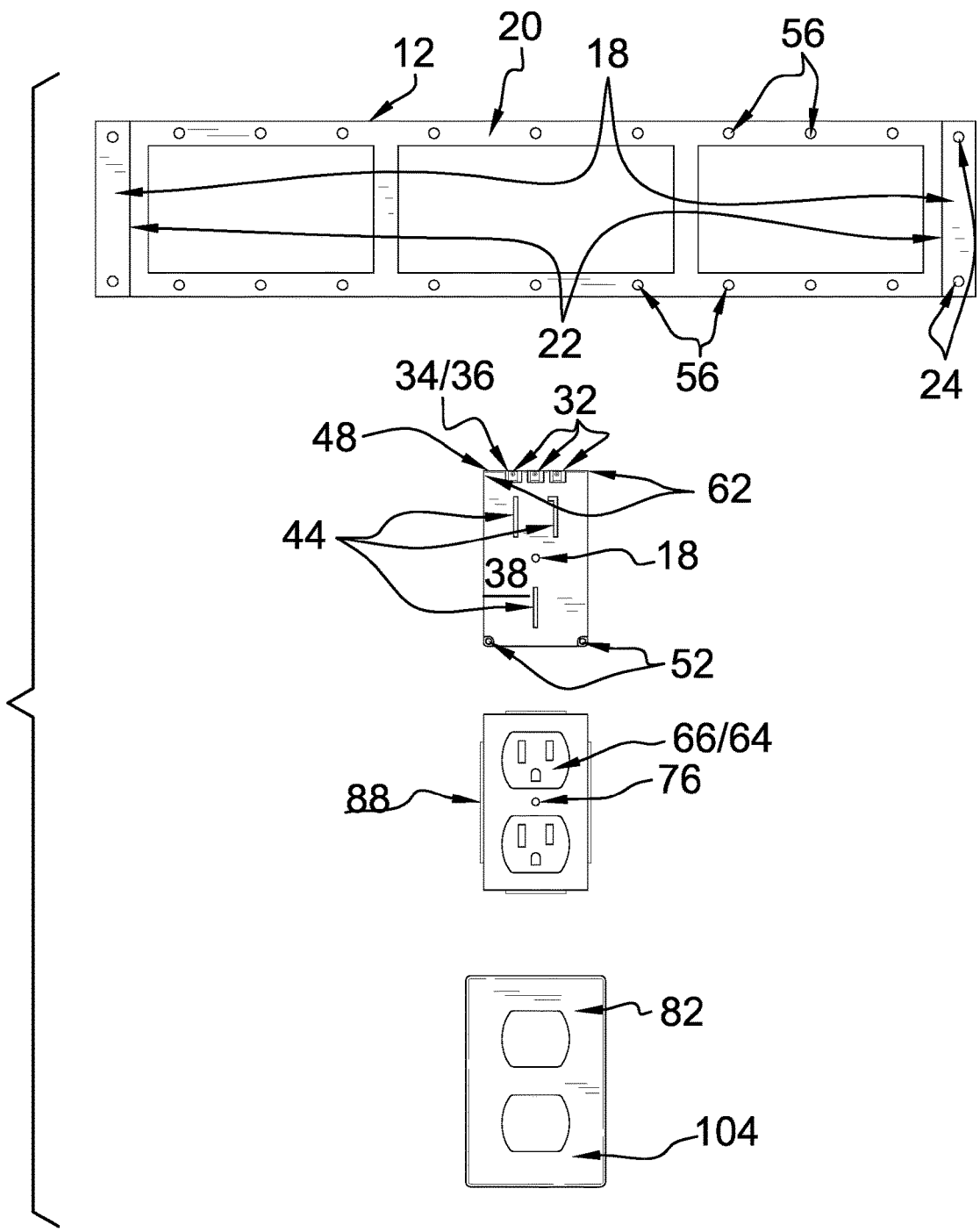
Figure 3:
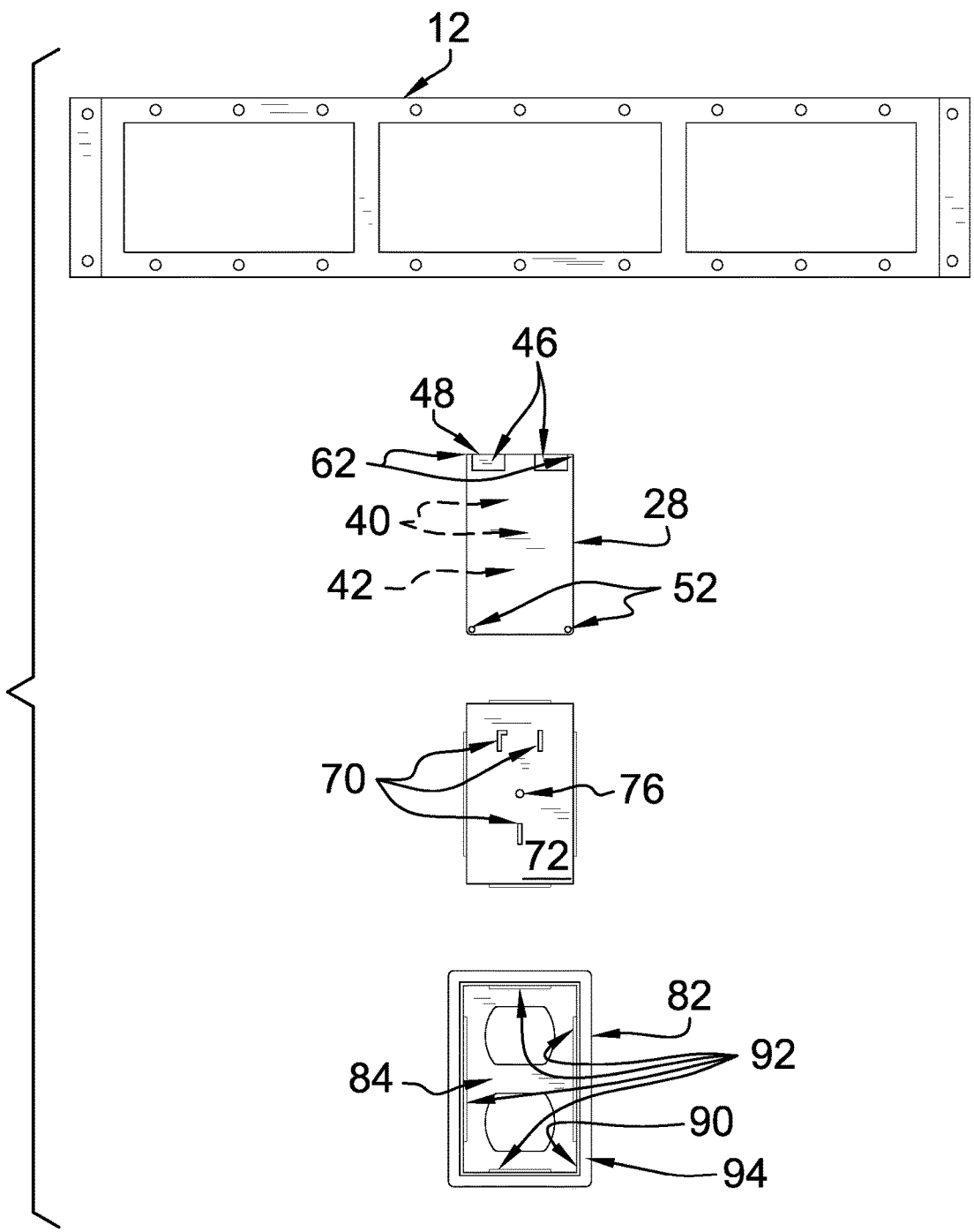
Figure 4:
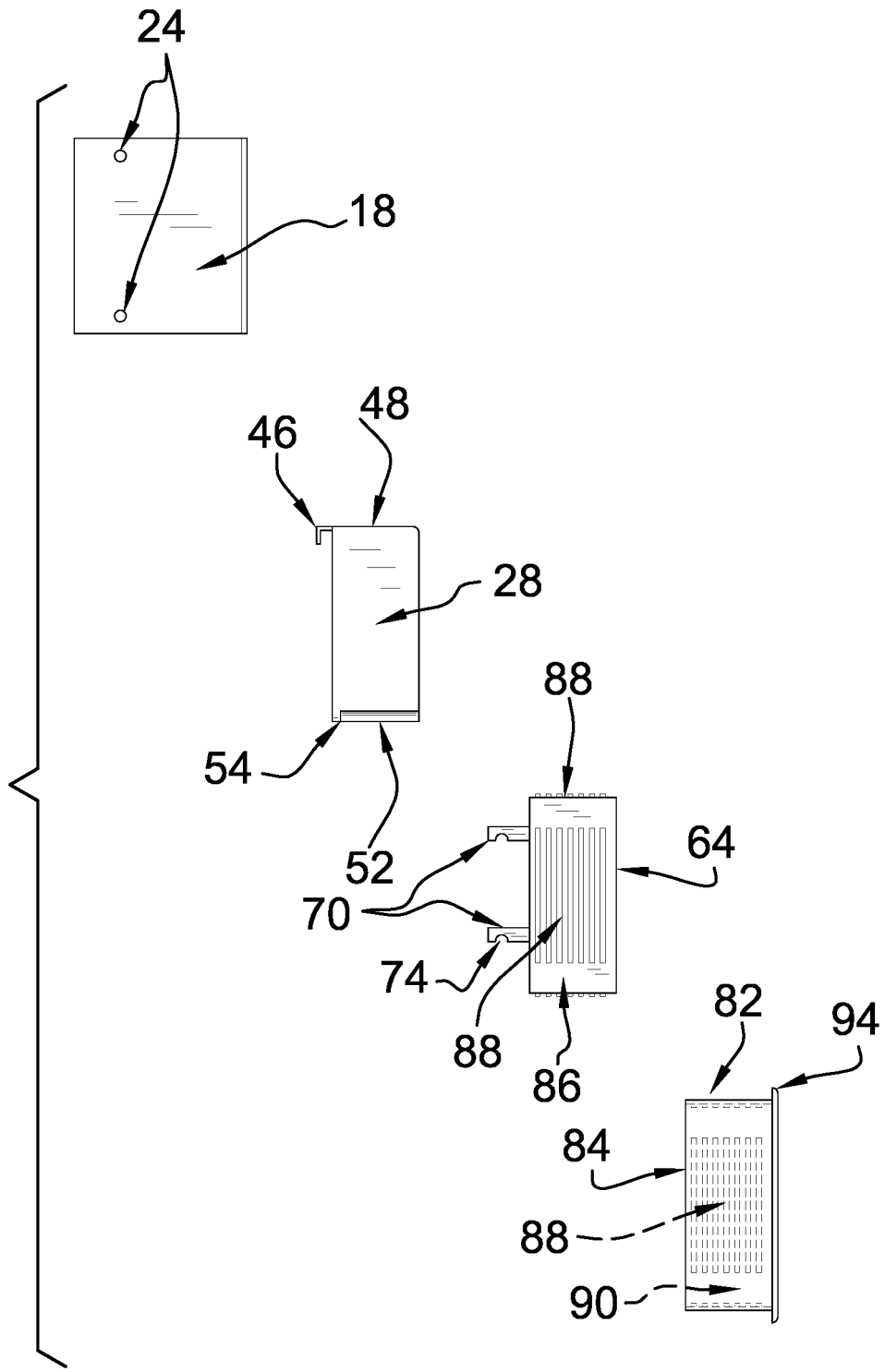
Figure 5:
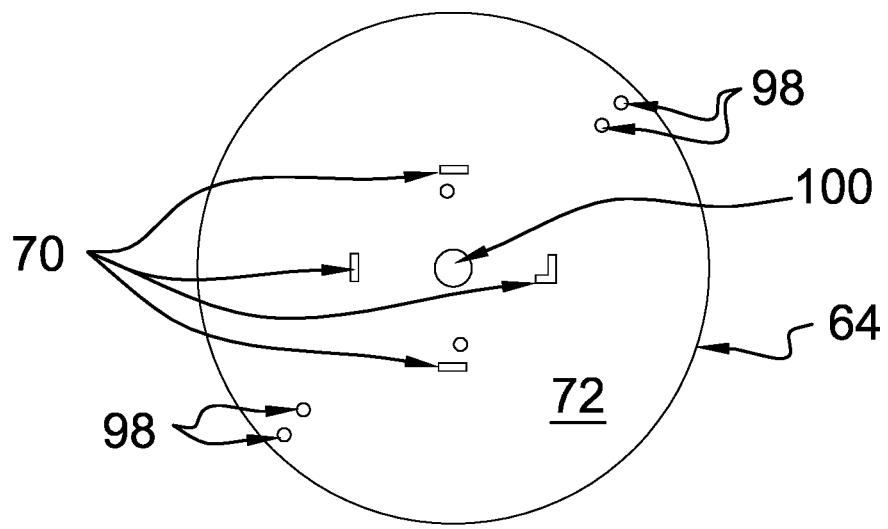
Figure 6:
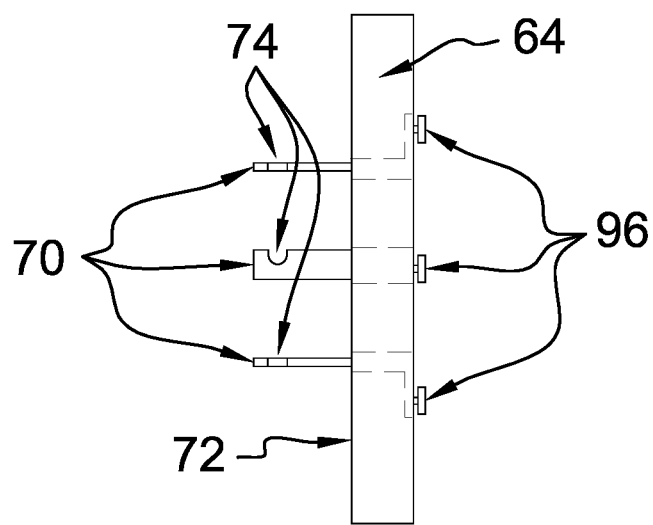
Figure 7:
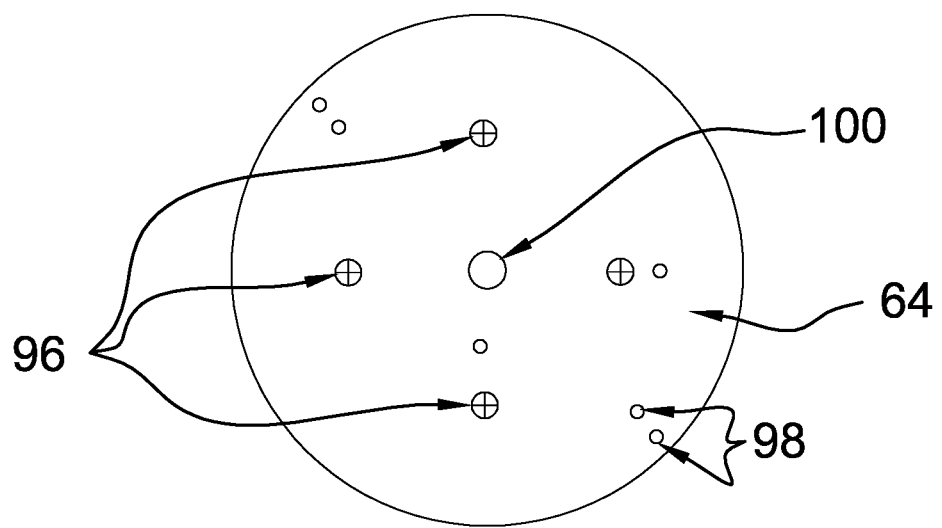
Figure 8:
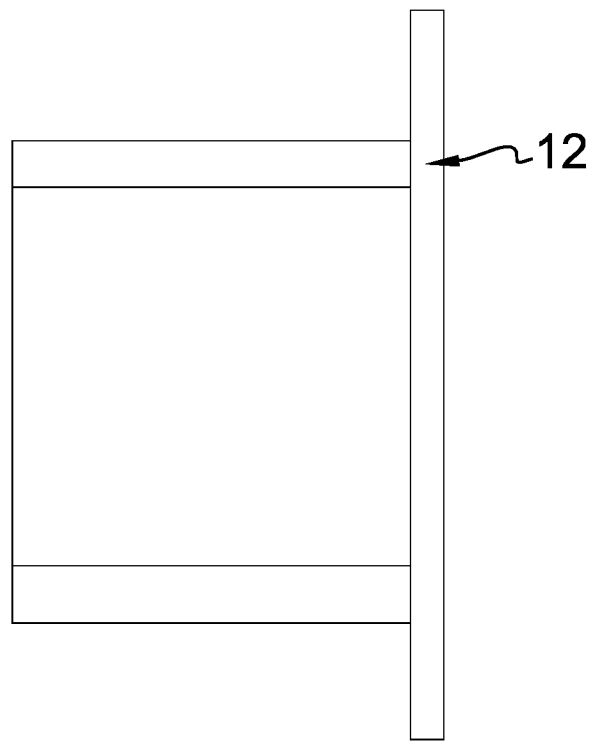
Figure 9:
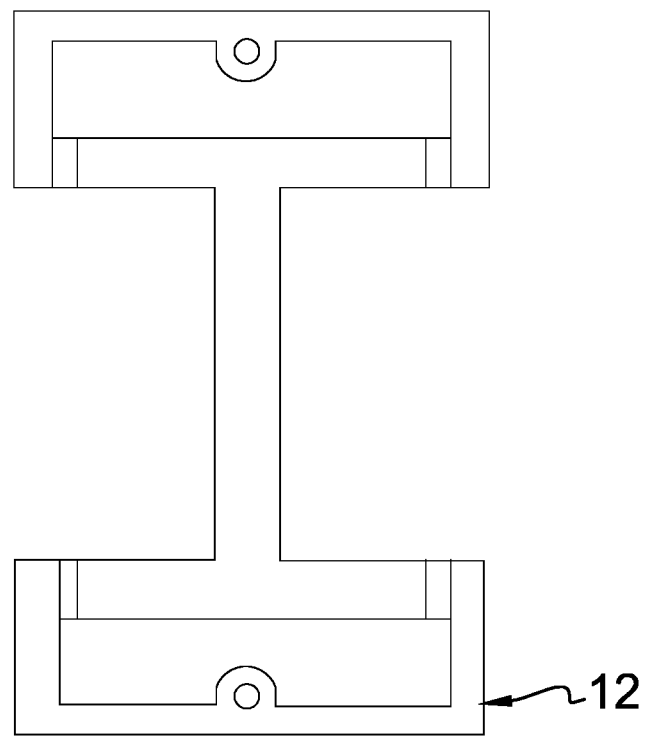
Figure 10:
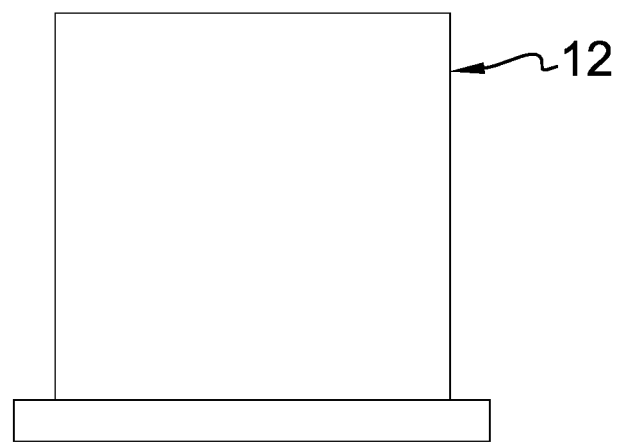
Figure 11:
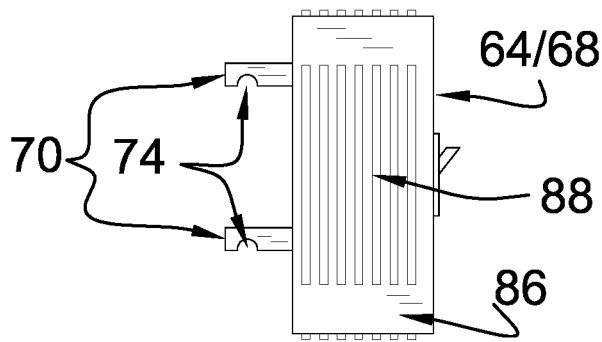
Figure 12:
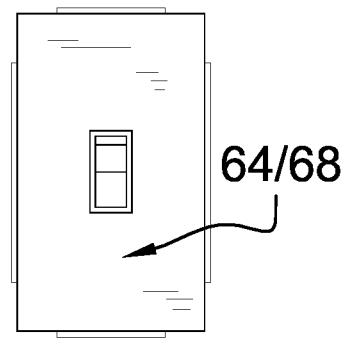
Figure 13:
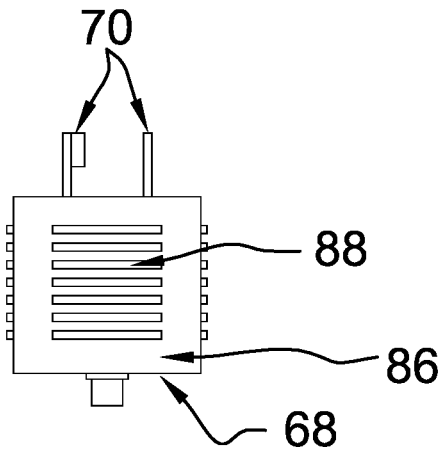
Figure 14:
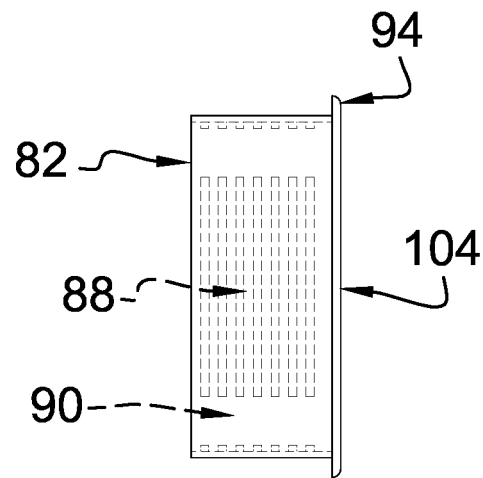
Figure 15:
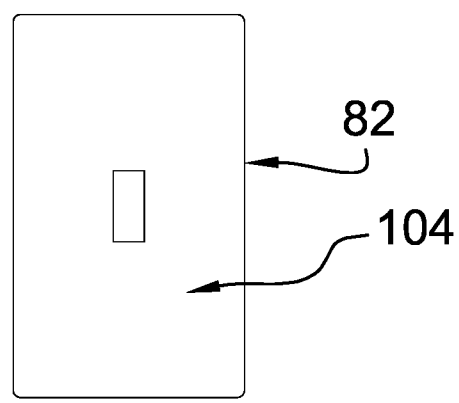
Figure 16:
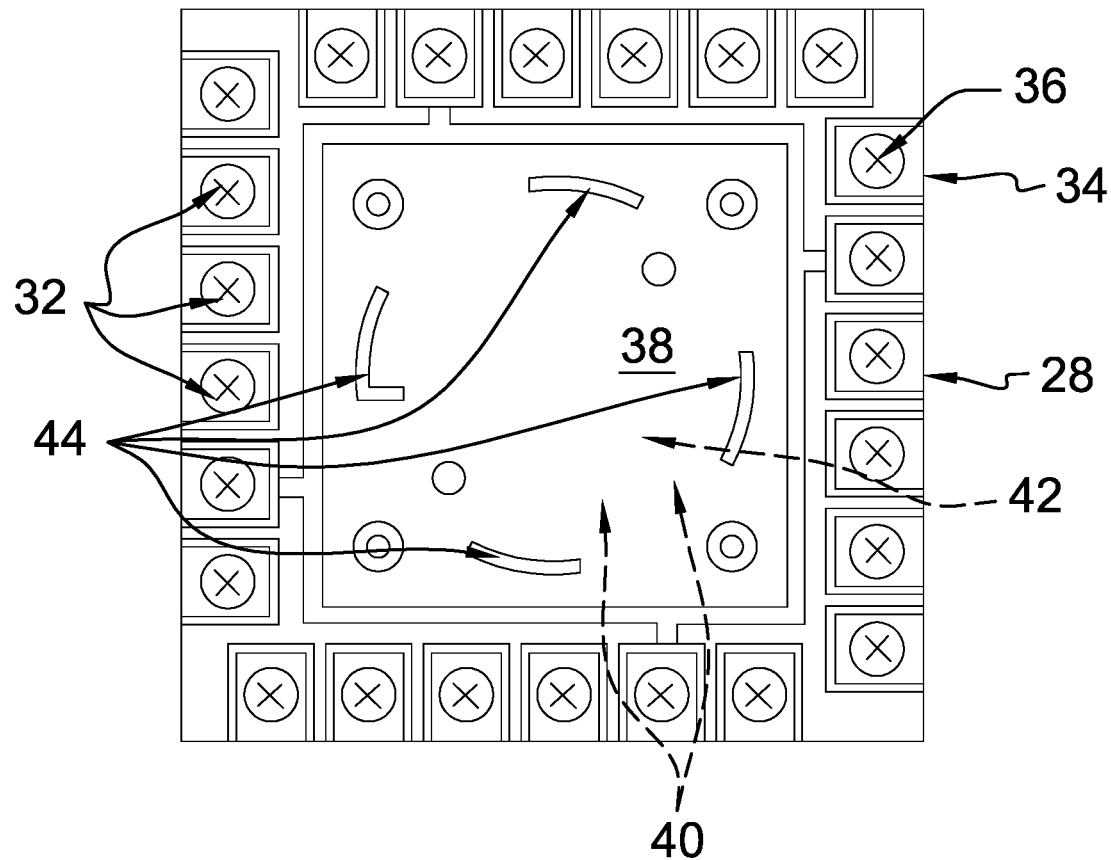

The disclosure will be better understood and objects other than those set forth above will become apparent when consideration is given to the following detailed description thereof. Such description makes reference to the annexed drawings wherein:

FIG. 1 is an exploded view of a modular electrical wiring assembly according to an embodiment of the disclosure.
FIG. 2 is a front view of an embodiment of the disclosure.
FIG. 3 is a rear view of an embodiment of the disclosure.
FIG. 4 is a side view of an embodiment of the disclosure.
FIG. 5 is a front view of an embodiment of the disclosure.
FIG. 6 is a side view of an embodiment of the disclosure.
FIG. 7 is a rear view of an embodiment of the disclosure.
FIG. 8 is a side view of an embodiment of the disclosure.
FIG. 9 is a front view of an embodiment of the disclosure.
FIG. 10 is a top view of an embodiment of the disclosure.
FIG. 11 is a side view of an embodiment of the disclosure.
FIG. 12 is a front view of an embodiment of the disclosure.
FIG. 13 is a top view of an embodiment of the disclosure.
FIG. 14 is a side view of an embodiment of the disclosure.
FIG. 15 is a front view of an embodiment of the disclosure.
FIG. 16 is a top view of an embodiment of the disclosure.

DETAILED DESCRIPTION OF THE INVENTION

With reference now to the drawings, and in particular to FIGS. 1 through 16 thereof, a new wiring assembly embodying the principles and concepts of an embodiment of the disclosure and generally designated by the reference numeral 10 will be described.

As best illustrated in FIGS. 1 through 16, the modular electrical wiring assembly 10 generally comprises a bracket 12, which is configured to be mounted to a structural element 14 so that the bracket 12 is recessed from an outer surface 16 of the structural element 14. The bracket 12 may be configured to extend between and to be mounted to adjacent studs of a wall, as shown in FIG. 1, or joists, beams, or crossbeams of a ceiling or of a roof. The bracket 12 also may be configured to mount to a side face of a stud of a wall, or to a side face of a joist, a beam, or a crossbeam of a ceiling or of a roof. The bracket 12 also may be configured, as is shown in FIGS. 8-10, to be inserted into and mounted to a gang box installed in a structure, allowing existing electrical systems to be retrofitted.

In one example of a bracket 12 configured to extend between and to be mounted to adjacent studs of a wall, the bracket 12 comprises a pair of end elements 18 and a cross piece 20. The end elements 18 are engaged singly to opposed ends 22 of the cross piece 20. A plurality of plate holes 24 is positioned in the end elements 18. The plate holes 24 are configured for insertion of mounting hardware 26 to mount the bracket 12 to the adjacent studs. The end elements 18 may be sized so that the cross piece 20 is positioned substantially equally distant from opposed sides of the adjacent studs, as shown in FIG. 1. This sizing would be appropriate for interior walls, as will become apparent, as the bracket 12 is usable for mounting purposes from both opposed sides.

A receptacle 28 is selectively mountable to the bracket 12 and is configured to operationally engage an electrical circuit 30. Each of a plurality of connectors 32 is engaged to the receptacle 28 and is configured to operationally engage a respective wire of the electrical circuit 30. Each connector 32 may comprise a slot 34 and a set screw 36, or other connecting means, such as, but not limited to, screws, wire clips, and the like. The slot 34 is configured for insertion of the respective wire. The set screw 36 is configured to be tightened to fixedly engage the respective wire to the receptacle 28. The plurality of connectors 32 may be positioned on a front face 38 of the receptacle 28, although the present invention anticipates alternative positioning of the connectors 32.

A plurality of first contacts 40 is positioned in an interior space 42 defined by the receptacle 28. The plurality of first contacts 40 is operationally engaged to the plurality of connectors 32. A plurality of apertures 44 is positioned in the front face 38 of the receptacle 28.

The receptacle 28 may be engaged to the bracket 12 using a hanger 46, which is engaged to an upper end 48 of the receptacle 28. The hanger 46 is positioned to engage an upper limit 50 of the bracket 12 to hang the receptacle 28 from the bracket 12. A pair of channels 52 extends through the receptacle 28. The channels 52 are positioned singly proximate to lower corners 54 of the receptacle 28. A plurality of mounting holes 56 is positioned in the bracket 12 proximate to a lower limit 58 of the bracket 12. The mounting holes 56 are threaded. The channels 52 are selectively alignable with respective mounting holes 56, positioning the channels 52 for insertion of mounting screws 60. The mounting screws 60 are positioned for threaded insertion into the respective mounting holes 56 to fixedly engage the receptacle 28 to the bracket 12.

The present invention anticipates alternative engagement means for attaching the receptacle 28 to the bracket 12. For example, additional channels 52 positioned proximate to upper corners 62 of the receptacle 28 could be aligned with additional mounting holes 56 positioned proximate to the upper limit 50 of the bracket 12, allowing use of additional mounting screws 60 to complete attachment of the receptacle 28 to the bracket 12.

An interface element 64 is selectively mountable to the receptacle 28 so that the interface element 64 is operationally engaged to the electrical circuit 30. The interface element 64 may comprise one or more of an outlet 66, a socket (not shown), a switch 68, a bulb (not shown), a port (not shown), and the like.

A plurality of second contacts 70 is engaged to and extends from a rear surface 72 of the interface element 64. A respective second contact 70 is positioned for insertion into an associated aperture 44 to operationally engage an associated first contact 40. A notch 74 extending into the respective second contact 70 is positioned for at least partial insertion of the associated first contact 40 to engage the interface element 64 to the receptacle 28.

A through hole 76 is positioned in the interface element 64. A threaded hole 78 is positioned in a front face 38 of the receptacle 28. The through hole 76 is positioned for insertion of a threaded screw 80, positioning the threaded screw 80 for threaded insertion into the threaded hole 78 to secure the interface element 64 to the receptacle 28.

The modular electrical wiring assembly 10 also may comprise a cover plate 82, which is selectively engageable to the interface element 64 so that the interface element 64 is accessible. The cover plate 82 is configured to cover gaps between the interface element 64 and the structural element 14, or gaps between the interface element 64 and a wall panel engaged to the structural element 14.

The interface element 64 and the cover plate 82 may be substantially cuboid shaped, as shown in FIG. 1. The cover plate 82 has a back 84, which is open. The interface element 64 has an outer sidewall 86. A plurality of first ridges 88 is engaged to and extends from the outer sidewall 86. The cover plate 82 has an inner sidewall 90. A plurality of second ridges 92 is engaged to and extends from the inner sidewall 90. The second ridges 92 are positioned to selectively engage the first ridges 88 as the interface element 64 is inserted into the cover plate 82. The present invention anticipates other engagement means for attaching the cover plate 82 to the interface element 64, such as, but not limited to, magnets, suction cups, hook and loop fasteners, and the like.

A lip 94 is engaged to and extends radially from a front 104 of the cover plate 82. The lip 94 is configured to bridge and to cover a gap between the interface element 64 and a wall panel engaged to the structural element 14.

The interface element 64 may be shaped, as is shown in FIG. 6, complementarily to a canopy of the hanging fixture (not shown). The interface element 64 is insertable into the canopy and is configured to engage the canopy and to operationally engage wiring elements of the hanging fixture. Engagement of the interface element 64 to the receptacle 28 operationally engages the hanging fixture to the electrical circuit 30. The present invention also anticipates the interface element 64 being integral to the hanging fixture. Thus, a variety of hanging fixtures, each having an integrated interface element 64, could be selectively engaged to the receptacle 28.

A respective one of the second contacts 70 and the associated aperture 44 are L-shaped, as shown in FIG. 5, or curved L-shaped, as shown in FIG. 16, with a remainder of the second contacts 70 and a remainder of the apertures 44 being linear or arcuate, respectively. As such, the plurality of second contacts 70 is insertable into the plurality of apertures 44 in a single configuration.

Each of a set of connecting screws 96 is operationally engaged to an associated second contact 70, as shown in FIGS. 6 and 7. The connecting screw 96 is configured to selectively engage a respective wiring element to operationally engage the respective wiring element to the associated second contact 70.

For an interface element 64 shaped complementarily to a canopy of a hanging fixture, a plurality of canopy holes 98 may be positioned through the interface element 64. Each canopy hole 98 is selectively alignable with a respective complementary hole positioned in the canopy. The canopy hole 98 and the respective complementary hole are positioned for insertion of a fastening screw (not shown) to fasten the interface element 64 to the canopy. The interface element 64 also may have a bore hole 100 extending axially through it to allow for passage of wiring cable of the hanging fixture.

The present invention also anticipates color coding of the connectors 32, as well as a set of directions 102 covering installation of the bracket 12 and receptacle 28, connection of interface element 64, and disconnection of interface element 64, for installation and replacement.

In one example of use, the bracket 12 is positioned between adjacent stubs of a stud wall prior to installation of wall panels. The bracket 12 is affixed to the adjacent stubs by inserting the mounting hardware 26, such as screws or nails, through the plate holes 24 and into the adjacent studs. A required wire of the electrical circuit 30 is engaged to the receptacle 28 by insertion into a respective slot 34 and tightening of an associated set screw 36. With all of the required wires attached, the receptacle 28 is hung from the bracket 12 by the hanger 46 and affixed to the hanger 46 by inserting the mounting screws 60 through the channels 52 and into the mounting holes 56. After wall panels have been affixed to the stud wall and an opening has been cut to access the receptacle 28, the interface element 64 can be engaged to the receptacle 28. Lastly, the cover plate 82 is pushed onto the interface element 64 to cover gaps between the interface element 64 and the wall panel.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A modular electrical wiring assembly:
   a bracket configured to be mounted to a structural element, such that the bracket is recessed from an outer surface of the structural element;
   a receptacle selectively mountable to the bracket, the receptacle being configured for operationally engaging an electrical circuit;
   an interface element selectively mountable to the receptacle, such that the interface element is operationally engaged to the electrical circuit;
   a hanger engaged to an upper end of the receptacle, such that the hanger is positioned for engaging an upper limit of the bracket for hanging the receptacle from the bracket;
   a pair of channels extending through the receptacle and positioned singly proximate to lower corners of the receptacle; and
   a plurality of mounting holes positioned in the bracket proximate to a lower limit of the bracket, the mounting holes being threaded, such that the channels are selectively alignable with respective mounting holes, positioning the channels for insertion of mounting screws, such that the mounting screws are positioned for threaded insertion into the respective mounting holes for fixedly engaging the receptacle to the bracket.

2. The modular electrical wiring assembly of claim 1, wherein the bracket is:
   configured for extending between and mounting to adjacent studs of a wall, or joists, beams, or crossbeams of a ceiling or of a roof;
   configured for mounting to a side face of a stud of a wall, or to a side face of a joist, a beam, or a crossbeam of a ceiling or of a roof; or
   configured for insertion into and mounting to a gang box installed in a structure.

3. A modular electrical wiring assembly comprising:
   a bracket configured to be mounted to a structural element, such that the bracket is recessed from an outer surface of the structural element;
   a receptacle selectively mountable to the bracket, the receptacle being configured for operationally engaging an electrical circuit;
   an interface element selectively mountable to the receptacle, such that the interface element is operationally engaged to the electrical circuit
   a cover plate selectively engageable to the interface element, such that the interface element is accessible;
   wherein the bracket is:
      configured for extending between and mounting to adjacent studs of a wall, or joists, beams, or crossbeams of a ceiling or of a roof;
      configured for mounting to a side face of a stud of a wall, or to a side face of a joist, a beam, or a crossbeam of a ceiling or of a roof; or
      configured for insertion into and mounting to a gang box installed in a structure; and
   wherein the bracket comprises a pair of end elements engaged singly to opposed ends of a cross piece, a plurality of plate holes being positioned in the end elements, such that the plate holes are configured for insertion of mounting hardware for mounting the bracket to the adjacent studs.

4. The modular electrical wiring assembly of claim 3, wherein the end elements are sized such that the cross piece is positioned substantially equally distant from opposed sides of the adjacent studs.

5. The modular electrical wiring assembly of claim 1, further including a plurality of connectors engaged to the receptacle, each connector being configured for operationally engaging a respective wire of the electrical circuit.

6. The modular electrical wiring assembly of claim 5, wherein each connector comprises a slot and a set screw, wherein the slot is configured for insertion of the respective wire, wherein the set screw is configured for tightening for fixedly engaging the respective wire to the receptacle.

7. The modular electrical wiring assembly of claim 5, wherein the plurality of connectors is positioned on a front face of the receptacle.

8. The modular electrical wiring assembly of claim 1, wherein the interface element comprises one or more of a socket, a switch, a bulb, and a port.

9. A modular electrical wiring assembly comprising:
a bracket configured to be mounted to a structural element, such that the bracket is recessed from an outer surface of the structural element;
a receptacle selectively mountable to the bracket, the receptacle being configured for operationally engaging an electrical circuit;
an interface element selectively mountable to the receptacle, such that the interface element is operationally engaged to the electrical circuit
a cover plate selectively engageable to the interface element, such that the interface element is accessible;
a plurality of connectors engaged to the receptacle, each connector being configured for operationally engaging a respective wire of the electrical circuit;
a plurality of first contacts positioned in an interior space defined by the receptacle and being operationally engaged to the plurality of connectors;
a plurality of apertures positioned in a front face of the receptacle; and
a plurality of second contacts engaged to and extending from a rear surface of the interface element, such that a respective second contact is positioned for insertion into an associated aperture for operationally engaging an associated first contact.

10. The modular electrical wiring assembly of claim 9, wherein a notch extends into the respective second contact, such that the notch is positioned for at least partial insertion of the associated first contact for engaging the interface element to the receptacle.

11. The modular electrical wiring assembly of claim 1, further including:
a through hole positioned in the interface element; and
a threaded hole positioned in a front face of the receptacle, such that the through hole is positioned for insertion of a threaded screw, positioning the threaded screw for threaded insertion into the threaded hole for securing the interface element to the receptacle.

12. The modular electrical wiring assembly of claim 1, further including a cover plate selectively engageable to the interface element, such that the interface element is accessible, wherein the cover plate is configured for covering gaps between the interface element and the structural element or between the interface element and a wall panel engaged to the structural element.

13. A modular electrical wiring assembly comprising:
a bracket configured to be mounted to a structural element, such that the bracket is recessed from an outer surface of the structural element;
a receptacle selectively mountable to the bracket, the receptacle being configured for operationally engaging an electrical circuit;
an interface element selectively mountable to the receptacle, such that the interface element is operationally engaged to the electrical circuit
a cover plate selectively engageable to the interface element, such that the interface element is accessible;
the interface element and the cover plate being substantially cuboid shaped, the cover plate having a back, the back being open;
the interface element having an outer sidewall;
a plurality of first ridges engaged to and extending from the outer sidewall;
the cover plate having an inner sidewall;
a plurality of second ridges engaged to and extending from the inner sidewall,
such that the second ridges are positioned for selectively engaging the first ridges as the interface element is inserted into the cover plate; and
a lip engaged to and extending radially from a front of the cover plate, wherein
the lip is configured for bridging and covering a gap between the interface element and the structural element or between the interface element and a wall panel engaged to the structural element.

14. The modular electrical wiring assembly of claim 9, further including the interface element being shaped complementarily to a canopy of a hanging fixture, such that the interface element is insertable into the canopy, the interface element being configured engaging the canopy and for operationally engaging wiring elements of the hanging fixture, such that that engagement of the interface element to the receptacle operationally engages the hanging fixture to the electrical circuit.

15. The modular electrical wiring assembly of claim 14, wherein a respective one of the second contacts and the associated aperture are L-shaped or curved L-shaped, with a remainder of the second contacts and a remainder of the apertures being linear or arcuate, respectively, such that the plurality of second contacts is insertable into the plurality of apertures in a single configuration.

16. The modular electrical wiring assembly of claim 14, further including a set of connecting screws, each connecting screw being operationally engaged to an associated second contact, the connecting screw being configured for selectively engaging a respective wiring element for operationally engaging the respective wiring element to the associated second contact.

17. The modular electrical wiring assembly of claim 14, further including a plurality of canopy holes positioned through the interface element, each canopy hole being selectively alignable with a respective complementary hole positioned in the canopy, positioning the canopy hole and the respective complementary hole for insertion of a fastening screw for fastening the interface element to the canopy.

18. A modular electrical wiring assembly comprising:
a bracket configured to be mounted to a structural element, such that the bracket is recessed from an outer surface of the structural element, the bracket being:
configured for extending between and mounting to adjacent studs of a wall, or joists, beams, or crossbeams of a ceiling or of a roof, the bracket comprising a pair of end elements engaged singly to opposed ends of a cross piece, a plurality of plate holes being positioned in the end elements, such that the plate holes are configured for insertion of mounting hardware for mounting the bracket to the adjacent studs, the end elements being sized such that the cross piece is positioned substantially equally distant from opposed sides of the adjacent studs, configured for mounting to a side face of a stud of a wall, or to a side face of a joist, a beam, or a crossbeam of a ceiling or of a roof, or configured for insertion into and mounting to a gang box installed in a structure;

a receptacle selectively mountable to the bracket, the receptacle being configured for operationally engaging an electrical circuit;

a plurality of connectors engaged to the receptacle, each connector being configured for operationally engaging a respective wire of the electrical circuit, each connector comprising a slot and a set screw, wherein the slot is configured for insertion of the respective wire, wherein the set screw is configured for tightening for fixedly engaging the respective wire to the receptacle, the plurality of connectors being positioned on a front face of the receptacle;

a plurality of first contacts positioned in an interior space defined by the receptacle and being operationally engaged to the plurality of connectors;

an interface element selectively mountable to the receptacle, such that the interface element is operationally engaged to the electrical circuit, the interface element comprising one or more of a socket, a switch, a bulb, and a port;

a plurality of apertures positioned in a front face of the receptacle;

a plurality of second contacts engaged to and extending from a rear surface of the interface element, such that a respective second contact is positioned for insertion into an associated aperture for operationally engaging an associated first contact;

a notch extending into the respective second contact, such that the notch is positioned for at least partial insertion of the associated first contact for engaging the interface element to the receptacle;

a hanger engaged to an upper end of the receptacle, such that the hanger is positioned for engaging an upper limit of the bracket for hanging the receptacle from the bracket;

a pair of channels extending through the receptacle and positioned singly proximate to lower corners of the receptacle; and a plurality of mounting holes positioned in the bracket proximate to a lower limit of the bracket, the mounting holes being threaded, such that the channels are selectively alignable with respective mounting holes, positioning the channels for insertion of mounting screws, such that the mounting screws are positioned for threaded insertion into the respective mounting holes for fixedly engaging the receptacle to the bracket.

* * * * *